Figure 1:
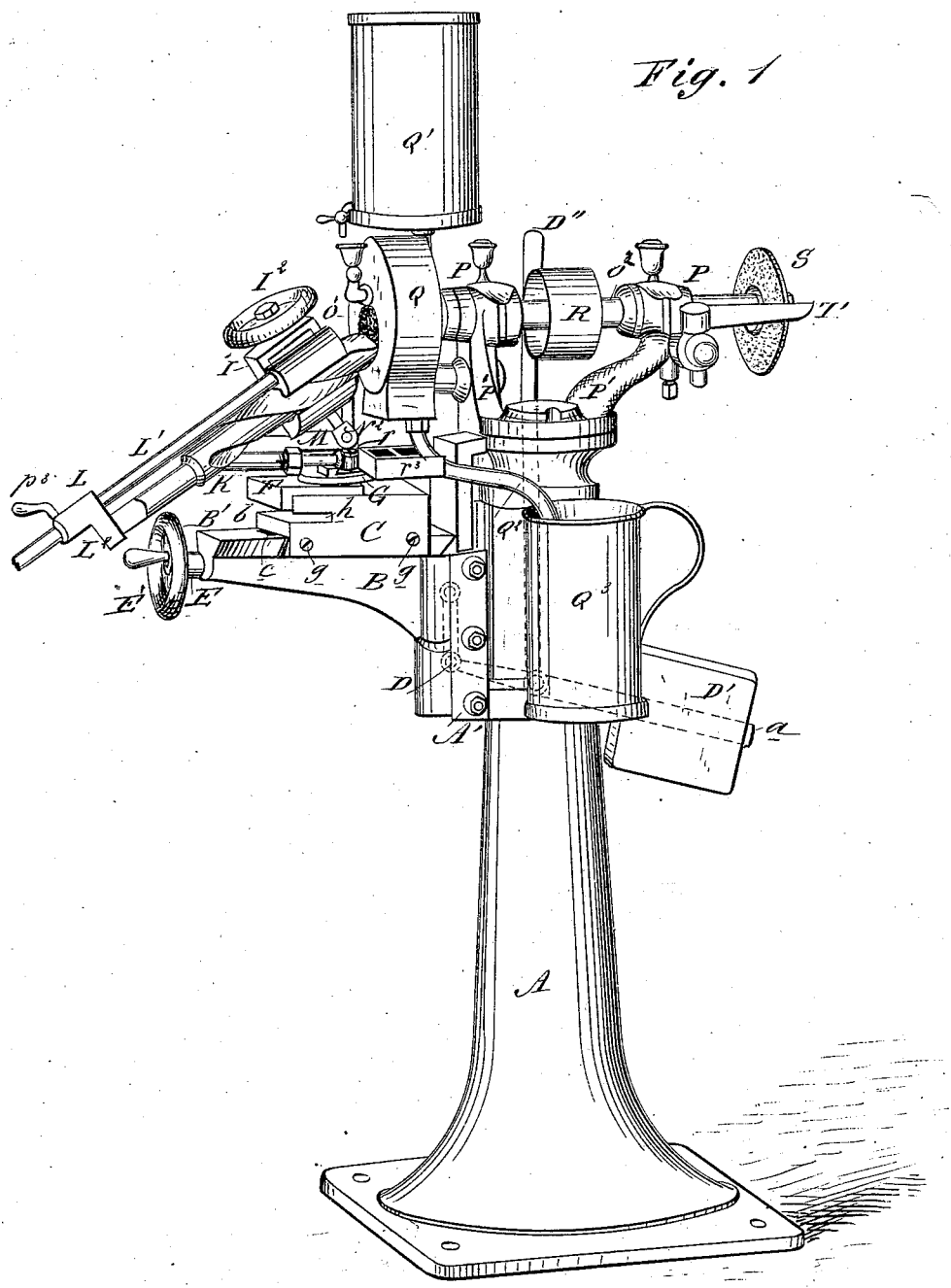

(No Model.)  4 Sheets—Sheet 1.

G. R. STETSON.
Twist Drill Grinding Machine.

No. 237,922.  Patented Feb. 15, 1881.

WITNESSES:
C. Neveux
C. Sedgwick

INVENTOR:
G. R. Stetson
BY Munn & Co.
ATTORNEYS.

(No Model.) 4 Sheets—Sheet 2.
G. R. STETSON.
Twist Drill Grinding Machine.
No. 237,922. Patented Feb. 15, 1881.
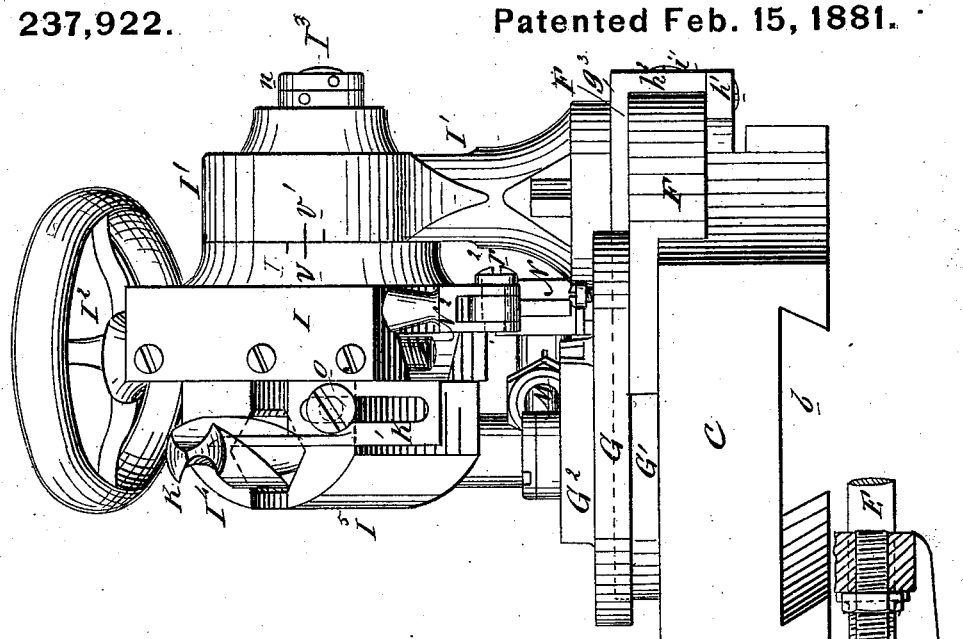
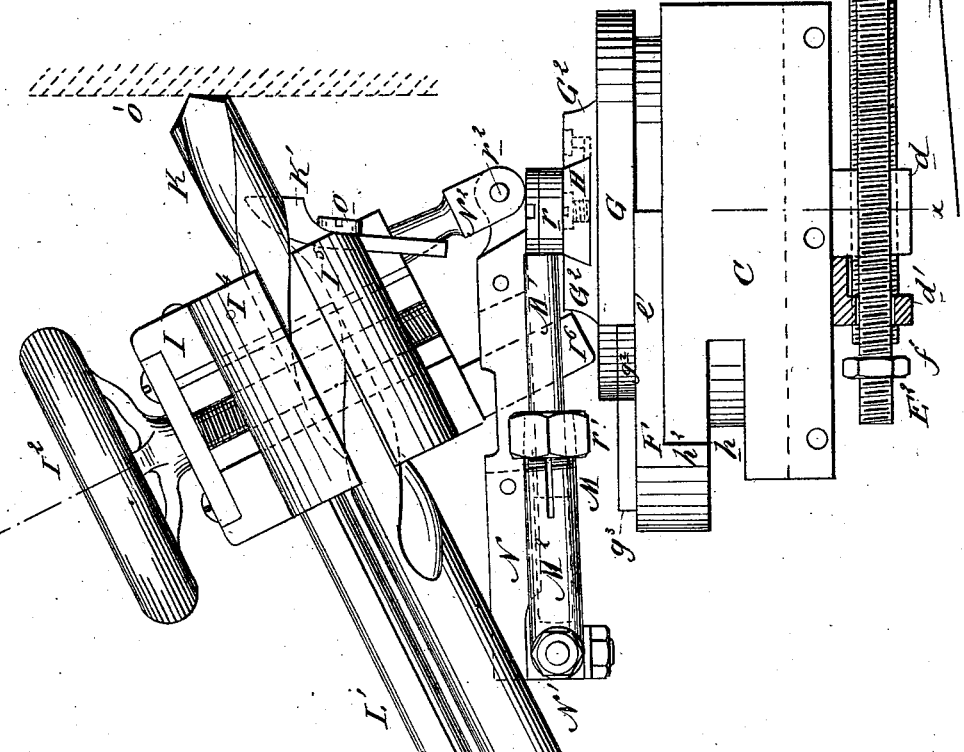
WITNESSES:
C. Neveux
C. Sedgwick
INVENTOR:
G. R. Stetson
BY Munn &Co
ATTORNEYS.
N. PETERS, PHOTO-LITHOGRAPHER, WASHINGTON, D.C.

(No Model.) 4 Sheets—Sheet 3.
G. R. STETSON.
Twist Drill Grinding Machine.
No. 237,922. Patented Feb. 15, 1881.
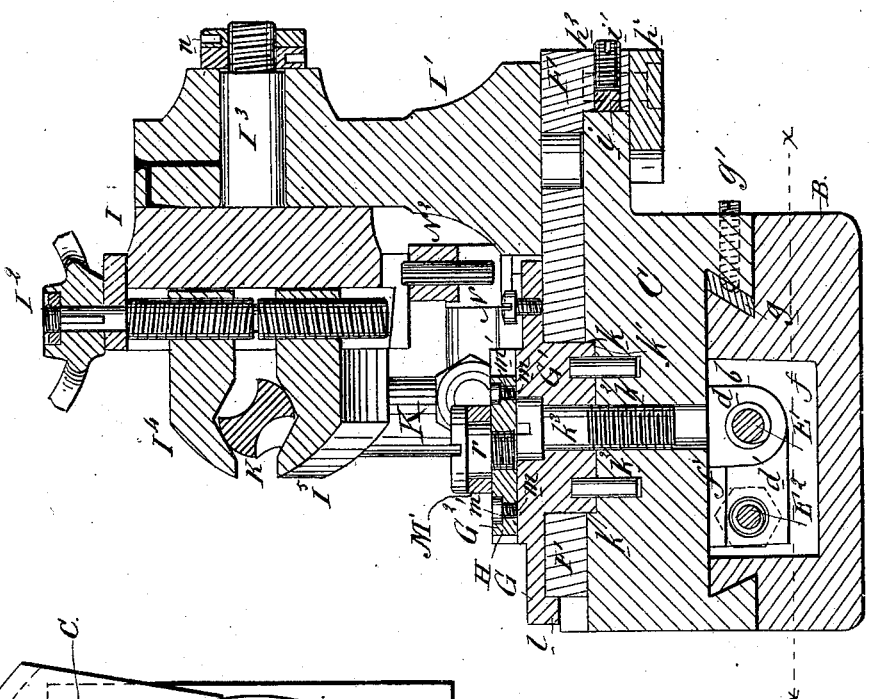
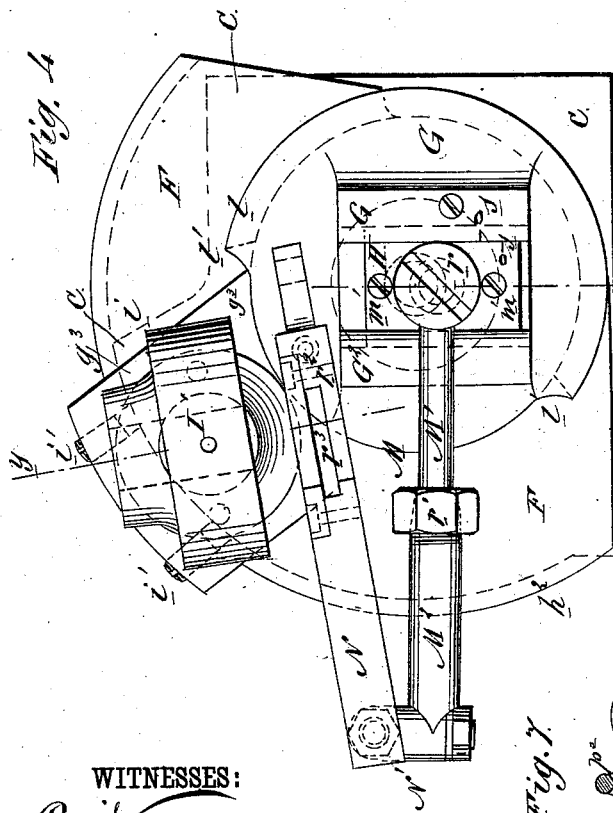
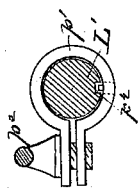
WITNESSES:
C. Neveux
C. Sedgwick
INVENTOR:
G. R. Stetson
BY Munn & Co
ATTORNEYS.

(No Model.) 4 Sheets—Sheet 4.
G. R. STETSON.
Twist Drill Grinding Machine.
No. 237,922. Patented Feb. 15, 1881.
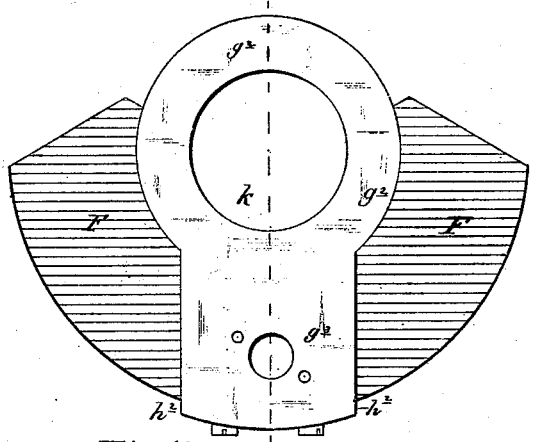
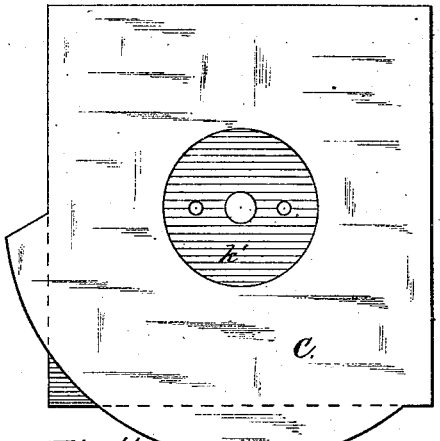
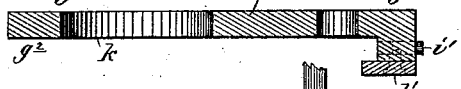
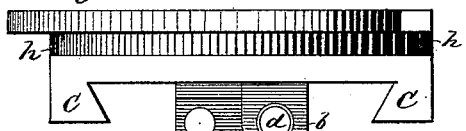
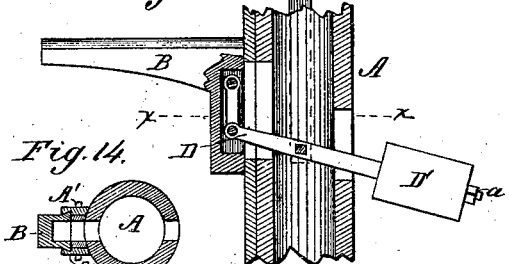
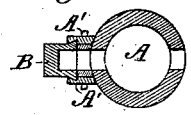
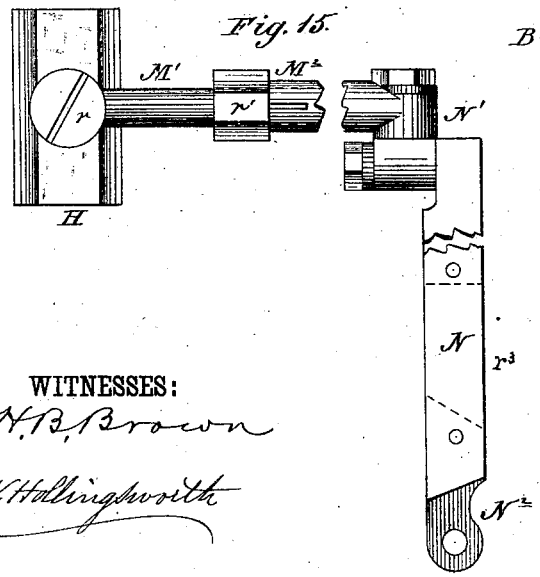
WITNESSES:
H. B. Brown
W. W. Hollingworth
INVENTOR:
G. R. Stetson
BY
ATTORNEYS.
N. PETERS, PHOTO-LITHOGRAPHER, WASHINGTON, D. C.

UNITED STATES PATENT OFFICE.

GEORGE R. STETSON, OF NEW BEDFORD, MASS., ASSIGNOR TO HIMSELF AND MORSE TWIST DRILL AND MACHINE COMPANY, OF SAME PLACE.

TWIST-DRILL-GRINDING MACHINE.

SPECIFICATION forming part of Letters Patent No. 237,922, dated February 15, 1881.

Application filed November 18, 1880. (No model.)

*To all whom it may concern:*

Be it known that I, GEORGE R. STETSON, of New Bedford, in the county of Bristol and State of Massachusetts, have invented a new and Improved Twist-Drill-Grinding Machine, of which the following is a specification.

The object of this invention is to provide an improved tool for the automatic presentation of a drill to the grinding-wheel, and for the rapid and accurate grinding of said drill.

The invention consists of a sliding head adjustable on a suitable standard, so as to be moved toward or from the grinding-wheel, and supporting a horizontally-swinging bed, on which is mounted a chuck or jaws for holding the drills to be ground, and supporting also an adjustable sliding plate or fulcrum, and a system of levers connecting the same with the chuck or jaws, whereby the latter may be vertically adjusted; and it consists, further, of a stop and a drill-guide attached to the chuck, of novel arrangement of grinding-wheels and other parts, all of which will be hereinafter described.

Figure 1 is a perspective view of the device. Fig. 2 is an enlarged side elevation of the sliding head and its connections. Fig. 3 is an enlarged front view of the same. Fig 4 is an enlarged plan of the same with chuck removed. Fig. 5 is an enlarged sectional elevation of the same on lines $x\,x$, Fig. 2, and $y\,y$, Fig. 4. Fig. 6 is a detailed sectional view of the stop and nut on the guide-rod. Fig. 7 is a section through the stop-rod, taken on line $x\,x$, Fig. 6. Fig. 8 is a plan view of the swinging bed. Fig. 9 is a like view of the sliding head; Fig. 10, a section taken on line $x\,x$ of Fig. 8; Fig. 11, an end view of the sliding head. Fig. 12 is a sectional view, taken on line $x\,x$, Fig. 5, showing the operating-screws; Fig. 13, a detail sectional view of the standard, showing the head-plate, levers, and weight. Fig. 14 is a section taken on line $x\,x$ of Fig. 13; and Fig. 15 is a view showing gage-levers.

Similar letters of reference indicate corresponding parts.

In the accompanying drawings, A represents a standard, to the upper part of which are secured vertical parallel guides A', between which is held the forward-projecting bed-plate B, that supports the sliding-head C and the mechanism attached thereto. Said bed-plate B is vertically adjustable by means of an elbow-lever, D, that is operated by a handle, D'', and is provided on its free end with a weight, D'. Said lever D is fulcrumed within the standard A, and has one end secured in the bed-plate B, while the other end of said lever D extends rearward in the opposite direction from the bed-plate B through the standard A, and has on its end the weight D', which is adjustable on said lever D by means of the nut $a$.

On the upper face of the bed-plate B is formed a triangular slide, B', extending from front to rear thereof, and fitting in a corresponding groove, $b$, in the bottom of the sliding head C. Said slide B' is longitudinally slotted through part of its length, as indicated at $c$, Fig. 1, to permit of the movement of the lug $d$, that projects downward from the sliding head C into the chamber $f$ of the bed-plate B, as shown in Figs. 2 and 5. A screw, E, having a band-wheel, E', on its outer end, is entered through the front of the bed-plate B, through the chamber $f$, and through the screw-threaded lug $d$ of the sliding head C. A fixed screw, E², parallel with the screw E, is also entered into the chamber $f$, through the front of the bed-plate B, and passed through the ear $d'$ of the lug $d$. On turning the screw E in one direction the sliding head C is moved from the standard A until the lug $d$ abuts against the front of the chamber $f$, and on turning said screw E in the opposite direction the sliding head C is moved toward the standard A until the lug-ear $d'$ abuts against a check-nut, $f'$, fixed on the free end of the screw E², and in this manner the adjustment of the tools to be ground to or from the grinding-wheel is effected.

In order to tighten the sliding head C laterally in position a plate, $g$, is introduced in one side of its groove $b$, and pressed inward, as may be required, by the set-screws $g'\,g'$, against the slide B'.

The sliding head C has a curved groove, $h$, formed horizontally in its face, and extending partly around its sides, to accommodate the clamping-plate $h'$ of the swinging bed F, and above this groove $h$ the face of the sliding head C is extended forward and on one side, in the form of a quarter-circle, as shown at $i$, Fig. 4, against which the inner face of the correspondingly-curved downward-projecting rim $h^2$ of said swinging bed F slides as said bed F is moved to the right or left. Set-screws $i'\ i'$, entered through the rim $h^2$, where it is made thicker for the better holding of them, with their ends flush with the inside thereof, may be turned in against the rim of the circle $i$, to compensate for any wear between the face of said circle $i$ and the inner face of the rim $h^2$, so that the swinging bed F shall always swing evenly and without too much play. This swinging bed F is in the shape of a segment of a circle, with an open center at $k$, about which is a circular projection, $g^2$, having a rectangular projection, $g^3$, that extends to the thicker part of the rim $h^2$, and resting on top of the sliding head C. Said bed F is held in place by means of the cylindrical neck $G'$ of the circular cap G, which cap G, resting on top of the swinging bed F, is held immovably in place by the projection of the neck $G'$ down through the open center $k$ of the swinging bed F into a shallow circular socket, $k'$, in the top of the sliding head C, and, further, by the studs $k^2$, that project downward into corresponding sockets in the sliding head C, and, further, by a screw-bolt, $k^3$, that passes down through the center of said cap G into the sliding head C. This cap G has a downward-projecting rim, $l$, formed on the periphery for about three-quarters of its circumference, which fits around the circular piece $g^2$, as shown in Figs. 2 and 5, of the swinging bed F, and serves, by its termini, to form shoulders $l'$, that limit the swing of the said bed F by operating as stops for the contact of the edges of the rectangular projection $g^3$ when said swinging bed F is moved to the right or left.

On the top of the cap G, on either side of its central bolt-hole, are the parallel guides or slides $G^2$, that form an integral part of said cap G, or may be attached thereto. Between these slides $G^2$ is a sliding plate, H, having beveled edges to correspond with the inner faces of the guides $G^2$, and having oil-holes $m$, that are closed with screws $m'$. This sliding plate H serves as the fulcrum for the system of levers, as will be hereinafter explained.

An upright standard, $I'$, is bolted on the rectangular projection $g^3$ of the swinging bed F, and has journaled in it, at right angles thereto, the chuck I, the upper jaw, $I^4$, of which is adjustable by means of the hand-wheel and screw $I^2$, said jaws $I^4\ I^5$ being designed to grasp and hold the drill (represented at K) against the face of the grinding-wheel. The nuts $n$, screwed on the end of the chuck-arbor $I^3$, hold the chuck I to the standard $I'$, but so that said chuck I is free to rotate in a vertical plane, and as the swinging bed F may be moved in a horizontal plane the operator is enabled to present the lip of the drill K at any desired angle to the grinding-wheel.

Secured on the front of the lower jaw, $I^5$, of the chuck I by a bolt, $o$, is a slotted guide or gage, $K'$, whose forward curved and upward-projecting finger is designed to enter the groove or lip of a drill, for the purpose of regulating and limiting the adjustment and revolution of such drill relatively to the grinding-wheel, said guide or gage $K'$ being vertically adjustable, by reason of its slot, for adaptation to drills of different sizes.

Screwed or otherwise secured in the rear end of the upper jaw, $I^4$, of the chuck I, and in line with the face of said jaw $I^4$, is a rod, $L'$, projecting rearward, and serving as a holder and guide for the adjustable stop L, that serves as a support for the rear end of the drill K. Said stop L consists of a nut, $p$, fitted over the rod $L'$, and having formed on its rear end a larger collar, $p'$, that is radially split, and provided with perforated lugs, (shown in Fig. 7,) through the perforations of which a handled screw, $p^3$, is passed for drawing said lugs together, and thereby tightening said nut $p$ on the rod $L'$; and projecting inward from said collar $p'$ is a spline, $p^4$, that enters a corresponding keyway, $q$, in the rod $L'$, whereby said nut $p$ can slide on said rod $L'$ without turning. The nut $p$ is provided with an annular groove on its outside to receive the point of the set-screw $q'$, that holds the slide $L^2$ of the stop L on the said nut $p$, so that said slide $L^2$ may be freely rotated to accommodate itself to the end of a drill. Said slide $L^2$ is provided on its face with a raised edge, $q^2$, that serves as a lateral brace against the end of the drill K.

The system of levers that operate for adjusting the chuck I to increase or diminish the clearance of the drill-lip relatively to the grinding-wheel consists of a lever, M, pivoted so as to move in a horizontal plane by a screw-bolt, $r$, in the sliding plate H, said lever M being composed of a rod, $M'$, that enters a tube $M^2$, whose open end is split and encircled with a tightening-nut, $r'$, so that said lever M may be extended or expanded, as may be desired, for suitable adjustment of the chuck I. The opposite end of this lever M is connected with the rear end of a lever, N, by a swivel-joint, $N'$, the forward end of said lever N being pivoted on a horizontal pin, $r^2$, between the lugs of a rigid hanger, $N^2$, that depends from the under side of the chuck I. In the lever N is a vertical slot, $r^3$, down through which is projected a rigid tongue, $I^6$, from the bottom of the said chuck I, whereby a better leverage is had by the levers M N on the chuck I when the swinging bed F is rotated.

When the machine holding a drill is adjusted as shown in Fig. 2, the pivoting-point $r$ of the lever system M N, and their point of attachment $N^2$ with the chuck I, are at their farthest points apart, and the said chuck I is consequently inclined forward, so as to elevate the drill K in such a manner that the center of the web of said drill K—the extreme point of the drill—shall press against the vertically-revolving grinding-wheel $O'$. As the operator, taking hold of the rod $L'$, moves the outer end of said rod $L'$ to the right, the swinging bed F is thereby revolved and the points $r$ $N^2$ brought nearer to each other, with the effect of lengthening the said lever system M N, and thereby bringing the chuck I to an upright position, and the drill K to a horizontal position.

In grinding drills from half to one and a half inch in diameter, set the lip of the drill beyond the guide-finger K' enough to secure the necessary stock for grinding without cutting the guide. Larger drills should project beyond the guide from one-fourth to one-half inch.

The cross-slide or sliding plate H serves as a fulcrum for the levers M N, and, being adjustable, controls the said levers, and so secures more or less clearance for the lip of the drill K. When the sliding plate H is set so that the zero-marks $s$ $s$ shall correspond, sufficient working clearance is secured. If, on small drills, more clearance for the lip is desired, move the sliding plate H to the right. After moving the sliding plate H readjust the angle of the chuck I by drawing out the lever M until the mark $v$ on the said chuck I corresponds with the mark $v'$ on the standard I', the work being carried to the extreme left, or in position to commence its work. Any desired angle is secured by drawing out or shortening this lever M.

The marks $v$ $v'$ indicate the angles drills are usually ground to. It is not necessary to move the drill up or down during the grinding.

In using the machine the lip of the drill K is placed against the finger of the guide K', which latter can be adjusted to accommodate different sizes of drills. Then the slide $L^2$ is moved upon the rod L' until it bears against the end of the drill; then the work is moved up to the grinding-wheel O by turning the screw E, swinging the work to the right sufficiently to complete the clearance of the drill-lip, which brings the drill K in about a horizontal position, with the web or center thereof against the wheel O. Then the operator swings the bed F around by means of the rod L' until the said bed F strikes the left-hand stop $l'$, working easily without forcing the work. Then, when sufficient of the drill has been ground, the check-nut $f'$ is turned up against the lug-ear $d'$, to prevent farther rearward movement of the sliding head C. Then the drill may be removed and replaced in position for grinding the second lip, working the sliding head C up to the chuck-nut $f'$, as in the first grinding.

The grinding-wheel O', that should make about three thousand four hundred revolutions a minute, is preferably a free-cutting corundum-wheel, No. 46. It is fixed on an end of a horizontal shaft, $O^2$, which is journaled in suitable boxes P, that are supported on standards P' projecting upward from the top of the standard A.

Q represents a suitable guard over the wheel O'. This guard Q is closed at its lower end, and provided with a waste-water pipe, $Q^2$, for conducting the said waste water therefrom to a suitable receiver, $Q^3$. The wheel O' is supplied with water from a vessel, Q', arranged on top of said guard, as shown in Fig. 1 of drawings. Under the guard Q is suitably supported a pan, $r^3$, designed to collect any drops or dashes of water thrown by the wheel outside the guard. This pan has no outlet, but is to be removed by hand, when necessary, and emptied of any water thrown out by the wheel and collected therein.

R represents the driving-pulley of the wheel O', fixed on the shaft $O^2$; and S represents an edge-grinding wheel for thinning the webs of the drills when they have become thickened by grinding on the wheel O'.

T represents a rest fixed on a standard, P', for resting a drill upon for holding its web against the wheel S.

Having thus described my invention, I claim as new and desire to secure by Letters Patent—

1. In a twist-drill-grinding machine, the combination, with the swinging bed F, of the standard I', stem $I^3$, and chuck I and jaws $I^4$ $I^5$, substantially as herein shown and described, whereby a drill may be held and presented at any desired angle to a grinding-wheel, as set forth.

2. In a twist-drill-grinding machine, the combination, with the chuck I, upper chuck-jaw, $I^4$, and lower chuck-jaw, $I^5$, of the adjustable gage K', substantially as herein shown and described, whereby the adjustment and revolution of the drill are determined, as set forth.

3. In a twist-drill-grinding machine, the combination, with the sliding plate H, of the adjustable levers M N, connected with chuck I, stem $I^3$, and jaws $I^4$ $I^5$, substantially as herein shown and described, whereby motion is imparted to the drill or jaws, causing a movement that increases the clearance of the drill, or enables the grinding-wheel to remove more stock toward the end of the motion of the swinging table, as set forth.

4. In a twist-drill-grinding machine, the combination, with the cap G, provided with guides $G^2$, and levers M N, of the movable lever-fulcrum or sliding plate H, standard I', chuck I, stem $I^3$, and jaws $I^4$ $I^5$, substantially as herein shown and described, whereby the clearance of the drill is regulated, as set forth.

5. In a twist-drill-grinding machine, the combination, with the adjustable sliding head C, of the swinging head F, having an open center, circular cap G, provided with neck G', and guides $G^2$, sliding fulcrum or plate H, adjustable levers M N, and standard I', supporting chuck I, having jaws $I^4$ $I^5$, gage K', and hanger $N^2$, arranged and operated substantially as herein shown and described.

GEORGE RIPLEY STETSON.

Witnesses:
FRANCIS B. GREENE,
LEWIS B. HOLMES.